No. 713,039. Patented Nov. 4, 1902.
L. P. GRAHAM.
CORN PLANTER CLUTCH.
(Application filed May 27, 1902.)
(No Model.)
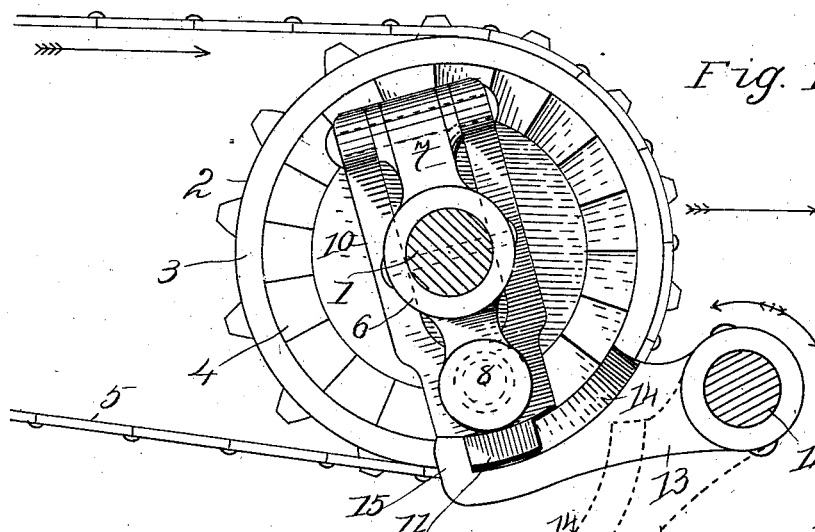
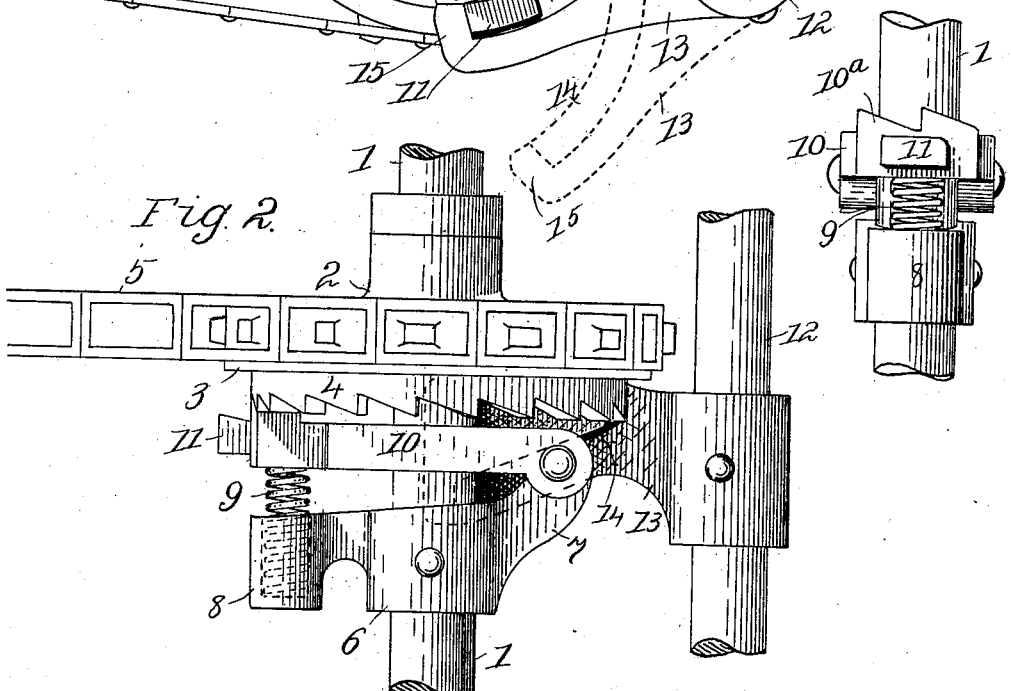
Witnesses
Ina Graham.
Nora Graham.
Inventor
L. P. Graham.
THE NORRIS PETERS CO., PHOTO-LITHO., WASHINGTON, D. C.

UNITED STATES PATENT OFFICE.

LEVI P. GRAHAM, OF DECATUR, ILLINOIS.

CORN-PLANTER CLUTCH.

SPECIFICATION forming part of Letters Patent No. 713,039, dated November 4, 1902.

Application filed May 27, 1902. Serial No. 109,243. (No model.)

*To all whom it may concern:*

Be it known that I, LEVI P. GRAHAM, of the city of Decatur, in the county of Macon and State of Illinois, have invented certain new and useful Improvements in Corn-Planter Clutches, of which the following is a specification.

This invention is in the nature of an improvement on the clutch patented to me May 10, 1892, No. 474,448; and the object is to provide improved and simplified means for intermittently imparting the motion of the covering-wheels of a planter to the dropping mechanism of the seedboxes. In the patent issued in 1892 the clutch is particularly applicable to a plunger-planter, and it is a part of the rule of action of the clutch of the patent that the spring through which the releasable clutch member is thrown in gear shall be put under tension by a preliminary rotating action and that the spring shall be relieved from tension while the clutch members are separated and the releasable clutch member is at rest. The clutch of this application is intended to be applied to planters having runners or other appliances for cutting continuous furrows, and provision is made for holding the spring of the releasable clutch member continuously under tension when the clutch members are separated, so that the clutch will be thrown in gear the instant the throw-out arm is moved clear of the releasable clutch member.

In the drawings forming part of this specification, Figure 1 is a side elevation of the clutch, and Fig. 2 is a plan thereof. Fig. 3 is a plan showing the end of the releasable clutch member, and Fig. 4 is a detail plan of the throw-out arm.

The shaft through which the dropping mechanism of the seedboxes is actuated and which is usually called the "drill-shaft" is designated by reference-numeral 1, and the check-row shaft is shown at 12. A sprocket-wheel 2 is journaled loosely on shaft 1. The wheel has sidewise-projecting ratchet-teeth 4, and an annular flange 3 extends from the ratchet-teeth alongside thereof. A chain 5 provides means for imparting motion to the clutch-wheel from the covering-wheel of a planter. A collar 6 is attached to shaft 1 opposite the teeth 4 of the clutch-wheel and some distance therefrom. An arm 7 extends from collar 6 away from the shaft and toward the ratchet-teeth. A releasable clutch member 10 is forked to straddle the shaft 1, is pivotally connected with arm 7, and has ratchet-teeth on its swingable end adapted to engage the teeth 4 of the wheel. A housing 8 for a spring 9 is formed on collar 6, on the side thereof opposite arm 7, and the spring 9 in the housing bears against the swingable end of the releasable clutch member and tends continuously to hold the clutch in gear. The operative end of the releasable clutch member is flush with the perimeter of the ratchet-teeth 4, and a stud 11 projects beyond the operative end of the releasable clutch member to a distance approximating the extension of flange 3. An arm 13 is fastened to the check-row shaft, and its swinging end is shaped to approximately conform to the perimeter of the ratchet-wheel, as shown in Fig. 1. A wedge-shaped cam 14 is formed on the face of arm 13, that engages the ratchet-wheel, and a stop extension 15 is formed at the wide end of the wedge.

When the throw-out arm 13 is in the position shown in solid lines in Fig. 1, the wedge 14 rests between flange 3 and stud 11, holding the releasable clutch member 10 from engagement with the wheel, while the stop 15 restrains the shaft 1 from forward rotation by holding back against the stud of clutch member 10. When the check-row shaft is rocked backward and the throw-out arm carried to the position shown by dotted lines in Fig. 1, the clutch member 10 is at once forced into engagement with the ratchet-wheel, and the shaft 1 is made to rotate with the continuously-revolving wheel. The rocking action of the check-row shaft is rapid, and the throw-out arm is quickly returned to the position shown in solid lines in Fig. 1 preparatory to intercepting the stud 11 of clutch member 10 and disengaging such member from the ratchet-wheel. As the shaft 1 nears a completion of a rotation the stud 11 strikes a side of the front end of the disengaging wedge 14, and further travel of the shaft compels the stud to ride along the inclined side of the wedge and separate member 10 from the ratchet-wheel. As the rotation of shaft 1 is entirely completed the stud 11 strikes stop 15 and effectually terminates the motion of the shaft.

The arm 13 normally extends from the check-row shaft around the ratchet-wheel, and the engaging end of the wedge 14 is presented toward the shaft. This arrangement of the throw-out arm permits the backward rock of the shaft to be transmitted directly to the arm in the proper direction to release the shiftable clutch member from the restraint of the wedge and the stop.

I claim—

1. In a clutch for planters, the combination of a shaft to actuate the dropping mechanism, a wheel journaled on the shaft, and provided with laterally-extending ratchet-teeth, a collar fastened onto the shaft, an arm on the collar extending away from the shaft, a shiftable clutch member pivoted at one end to the arm and extended across the shaft to a point opposite the ratchet-teeth, a stud on the end of the shiftable clutch member, a throw-out having an incline to engage the stud and force the shiftable clutch member from engagement with the ratchet-wheel and a spring continuously pressing the shiftable clutch member toward the ratchet-wheel.

2. In a clutch for planters, the combination of a shaft, to actuate the dropping mechanism, a wheel journaled on the drill-shaft and provided with laterally-extending ratchet-teeth a collar fastened to the shaft, arms extending from the collar in opposite directions, a shiftable clutch member pivoted to one of the arms of the collar and extended past the shaft to a point between the second arm and the ratchet-teeth, a spring between the second arm of the collar and the swinging end of the shiftable clutch member, and an inclined throw-out to disengage the shiftable clutch member from the ratchet-wheel, against the tension of the spring.

3. In a clutch for planters, the combination of a drill-shaft, a wheel journaled on the shaft and provided with laterally-extending ratchet-teeth, a shiftable clutch member attached to the shaft in position to engage the teeth of the ratchet-wheel, a stud on the shiftable clutch member, a check-row shaft, an arm on the check-row shaft normally extending from the shaft around the ratchet-wheel in the direction of the rotation of the wheel, and a throw-out incline on the arm the engaging end whereof is presented toward the check-row shaft.

In testimony whereof I sign my name in the presence of two subscribing witnesses.

LEVI P. GRAHAM.

Witnesses:
  NORA GRAHAM,
  INA GRAHAM.